United States Patent [19]
Braun et al.

[11] 3,885,447
[45] May 27, 1975

[54] SHIFT CONTROL

[75] Inventors: Eugene R. Braun, Royal Oak; Elmer A. Richards, Oshtemo, both of Mich.

[73] Assignee: Eaton Corp., Cleveland, Ohio

[22] Filed: Oct. 9, 1973

[21] Appl. No.: 404,189

[52] U.S. Cl. .............................. 74/336; 74/752 A
[51] Int. Cl. ............................. F16h 5/50
[58] Field of Search .......... 74/752 A, 752 D, 752 C, 74/336.5, 336, 859

[56] References Cited
UNITED STATES PATENTS

| | | | |
|---|---|---|---|
| 2,118,978 | 5/1938 | Maybach | 74/336.5 X |
| 2,293,758 | 7/1942 | Pescara | 74/336.5 X |
| 2,451,058 | 10/1948 | Bennetch | 74/336.5 X |
| 2,568,958 | 9/1951 | Hey et al. | 74/336.5 X |
| 2,658,408 | 11/1953 | Miller | 74/752 D |
| 3,125,893 | 3/1964 | Bensinger | 74/336.5 X |
| 3,167,970 | 2/1965 | Wagner et al. | 74/752 C |

*Primary Examiner*—Samuel Scott
*Assistant Examiner*—John Reep
*Attorney, Agent, or Firm*—Teagno & Toddy

[57] ABSTRACT

Transmission shift control. In order to provide as nearly as possible an automatically shifting transmission with the well-known advantages thereof, and yet to maintain basic operator control over same, with equally well-known advantages thereof, there is provided a transmission control which, when in an operator determined upshift mode, will automatically upshift to a ratio preselected by the operator but not beyond same nor will it while in such mode downshift regardless of load change, and which will when in an operator determined downshift mode, automatically downshift to a lower gear preselected by the operator but will not go beyond same nor will it while in such mode upshift regardless of load change. Thus, for example, in a road speed gear as load comes onto the vehicle such as by a minor grade or the appearance of a head wind, the vehicle speed may lug down but the transmission will not shift unless and until the operator permits same to happen by moving a gear selector to a lower speed position. Thus, the operator can determine by the nature of a load change whether or not a shift change should be permitted to take place and thereby minimize or eliminate unnecessary shifting in response to only minor changes in load.

12 Claims, 5 Drawing Figures

SHIFT CONTROL

FIELD OF THE INVENTION

The invention relates to semi-automatic transmission control means and particularly to a type thereof which will permit automatic upshift to but not beyond a point preselected by the operator and which will permit automatic downshifting to but not beyond a point preselected by the operator. Further, when the control means is in an operator determined upshift mode the transmission will not downshift regardless of increases in load on the vehicle drive system and when the control means is in an operator determined downshift mode the transmission will not upshift regardless of any lessening in such load. Thus, the advantages of automatic shifting are obtained while the operator still maintains basic control over the extent and nature of the shifts which are permitted to take place.

BACKGROUND OF THE INVENTION

The subject of automatic transmission shifting, especially for heavy-duty vehicles such as trucks, as compared to manual controlled transmission shifting for such vehicles, and the relative advantages of each, has received a great amount of attention for upwards of 40 years and is still subject to continuing attempts to provide a transmission having the maximum number of presently known advantages of each system with the minimum number of disadvantages of each thereof. As is well known, fully automatic shifting has certain advantages, especially for heavy-duty vehicles, among which are minimizing operator fatigue, insuring that shifting occurs at proper speed points and with proper synchronizing of the shifting components and to insure that all shifting steps take place accurately and quickly. On the other hand, it is equally well known that with fully automatic shifting, any changes of short duration occurring to the load on the vehicle's drive system may cause the transmission to shift to meet what, for example, may be only a momentarily increased load and then to shift back when the extra load has been removed. An example may be a small incline in the road or a short gust of heat wind, either of which could be met equally well by merely permitting the vehicle engine to lug down momentarily. Similarly a momentarily decreased load such as by a short flattening of an otherwise long and generally uniform upgrade when the transmission is in a climbing ratio may cause an upshift which will then be followed almost immediately by a return to the climbing ratio position. These unnecessary shifts substantially increase the wear on the transmission system and if the same could be at least minimized a transmission could be provided requiring less maintenance and having a longer life.

A further problem arises in connection with fully automatic transmissions in one common procedure for attempting to meet the problem aforesaid in that an automatic downshift is permitted to occur only at a speed somewhat less than that of the corresponding upshift. However, if this displacement of corresponding upshift and downshift speeds is sufficient to be of any real value, one of them will necessarily occur further away from the point of maximum power delivery, particularly of a diesel engine, that considerable inefficiency will be incurred. This has long been recognized, the term "hysteresis" has been applied to the power loss so arising and same is a well-recognized disadvantage of fully automatic transmission shifting systems, in addition to the further disadvantage of greater amount of, and complexity of, equipment required for effecting upshifting and downshifting at respectively different speeds.

At the other extreme, of course, is a fully manual control system which avoids the disadvantages above mentioned in the fully automatic system but which requires often a higher level of operator competence and conscientiousness than may be available in a given instance. Thus, it has long been desirable, and many systems have been proposed accordingly, to provide that the actual shifting steps are carried out automatically but selection thereof is controlled by the operator.

Accordingly, the objects of the invention include:

1. To provide a shift control for a transmission in which the direction of shifting and gear ratio ultimately attained in a shifting sequence may be manually determined while the actual shifting procedures themselves may be automatically carried out.

2. To provide shifting control means wherein the power loss in the hysteresis arising from different upshift and downshift speeds for a given shift position will be at least minimized and possibly even eliminated.

3. To provide apparatus, as aforesaid, wherein an operator may select an upshift position to which it is desired the vehicle will shift and the vehicle will then automatically shift up to that position but wherein same will not downshift regardless of load subsequently applied thereto unless and until the operator determines that a downshift is desirable.

4. To provide a shift control, as aforesaid, wherein the transmission will downshift to a position selected by the operator but will not downshift below such position nor will it subsequently upshift from such position unless and until so directed by the operator.

5. To provide apparatus, as aforesaid, wherein if during an upshift procedure a load is temporarily applied to the vehicle it will remain in an intermediate gear before resuming its automatic upshifting progression but it will not downshift from such gear in spite of increasing load applied thereto unless and until so directed by the operator.

6. To provide a transmission control, as aforesaid, wherein during a downshifting sequence if load is temporarily lessened on the vehicle, the downshifting progression may be slowed or delayed but the vehicle will not again upshift unless and until so directed by the operator.

7. To provide apparatus, as aforesaid, which can be constructed from generally available presently known components whereby both the manufacture and maintenance of the apparatus can be carried out at a minimum of cost.

8. To provide apparatus, as aforesaid, wherein the controls will be both simple and positive so as to insure effective operation and minimum maintenance.

Other objects and purposes of the invention will be apparent to persons acquainted with apparatus of this general type upon reading the following specification and inspecting the accompanying drawings.

SUMMARY OF THE INVENTION

The invention comprises a combination of manual speed selection with speed responsive automatic means for actually effecting the shift progression. Further, the invention contemplates means by which the shift progression may go toward the position designated by the operator but not away therefrom. Thus, on starting a vehicle from a standstill in a transmission having five speeds forward, the operator may select, for example, the top or fifth speed. In such case, as the vehicle gathers speed, it will automatically shift itself upwardly toward this speed but if road conditions are such that it cannot go beyond four speeds, it will remain in the fourth speed position. Further, even though the road conditions may then become adverse so that fourth speed is too high, the vehicle will still not shift downwardly without further intervention on the part of the operator. In this way a temporary lugging down of the engine due to a small incline or a sudden head wind gust will not effect a downshift unless the operator so elects and moves the selector appropriately. Likewise, if the operator feels that a downshift is in order, he may move the downshift selector to, for example, second speed and the vehicle will automatically shift downwardly toward second speed position. Similarly, during a downshift, if the vehicle encounters a minor downward incline the shift will not occur upwardly unless and until the operator so elects and moves the selector appropriately. In this manner the operator has sole control over which speed ratios are utilized, but the actual shifting is accomplished automatically and any possibility of cycling back and forth between adjacent speeds due to minor changes in road conditions is avoided without the necessity of providing different upshift and downshift speed sensors for initiating changes between given speed ratios.

DETAILED DESCRIPTION

Inasmuch as all components required for the transmission control of the invention are of presently known and readily available nature, it will be sufficient to indicate same schematically. Further, it is assumed that the transmission with which the illustrated embodiment of the invention is to be utilized is a transmission of known type wherein shifting is effected by appropriate engagement of friction clutches. Hence, it is considered sufficient if the diagram indicates only means by which engagement of said clutches is effected. Such transmissions are well known and need no detailed description. An example of such transmission is that set forth by U.S. Pat. No. 2,648,992 to J. G. Vincent. However, it will be recognized that other types of transmissions will be equally available. For example, a transmission shifted by engagement of appropriate jaw clutches can also be controlled by apparatus of the invention although in such case suitable synchronizing means will need to be provided.

Further, for simplicity, it will be assumed that the transmission consists of only three speeds forward and this will be sufficient to illustrate the concept of the invention. However, it will be recognized that same may be extended to any desired number of speeds and such extension may be readily provided by any skilled worker in the art. Thus, the limitation of the disclosure to only three speeds forward will be understood as being for simplicity and is in no sense limiting.

Figure 1:
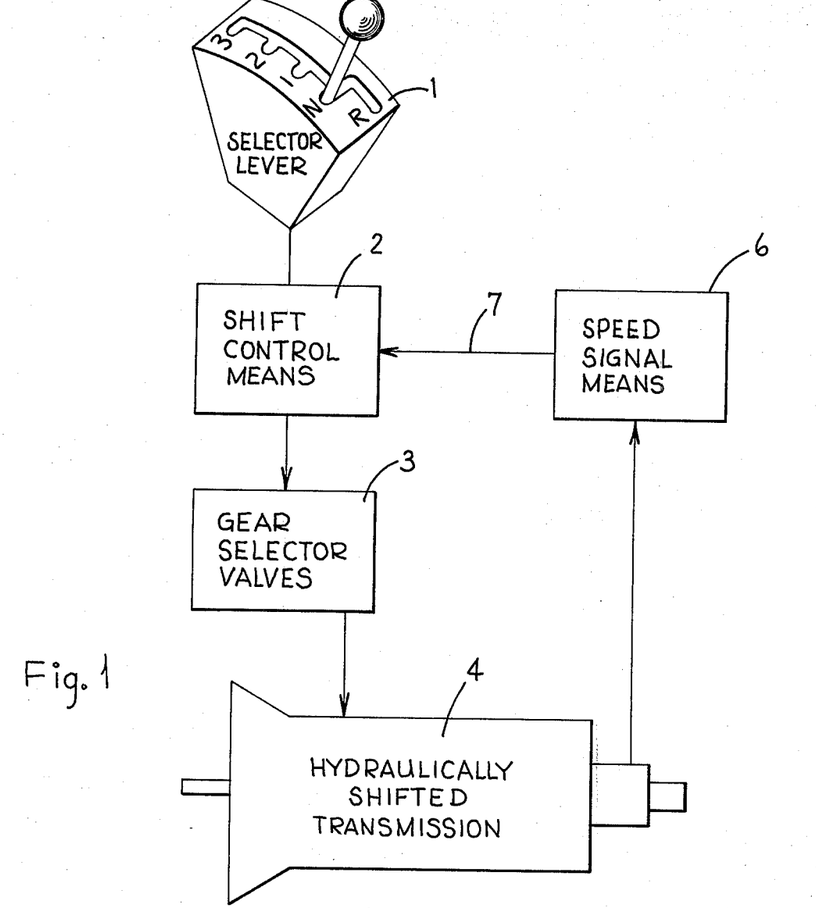
FIG. 1 is a diagrammatic view of the major components and their relationship comprising the invention.

Turning now to the drawings, reference is first made to FIG. 1 in which the general organization of the apparatus is set forth. A manually controllable selector device 1 comprises one of two controls for controlling suitable shift control means 2, said means to be described further hereinafter. The output of the shift control means 2 actuates desired ones of a plurality of gear selector valves in a suitable selector valve unit 3. The output of said gear selector valve unit is applied to the transmission for actuating appropriate ones of the ratio selecting clutches. The output of the transmission, or other means sensitive to vehicle speed, is fed back to speed sensitive means 6 and imposed by its output 7 onto the shift control means 2. Thus, the area within which the speed sensitive means is effective and operative is determined by the manually controlled apparatus 1 and within such area the speed responsive means 6 will control the shift control means 2 and thus the actual shifting of the transmission.

Figure 2:
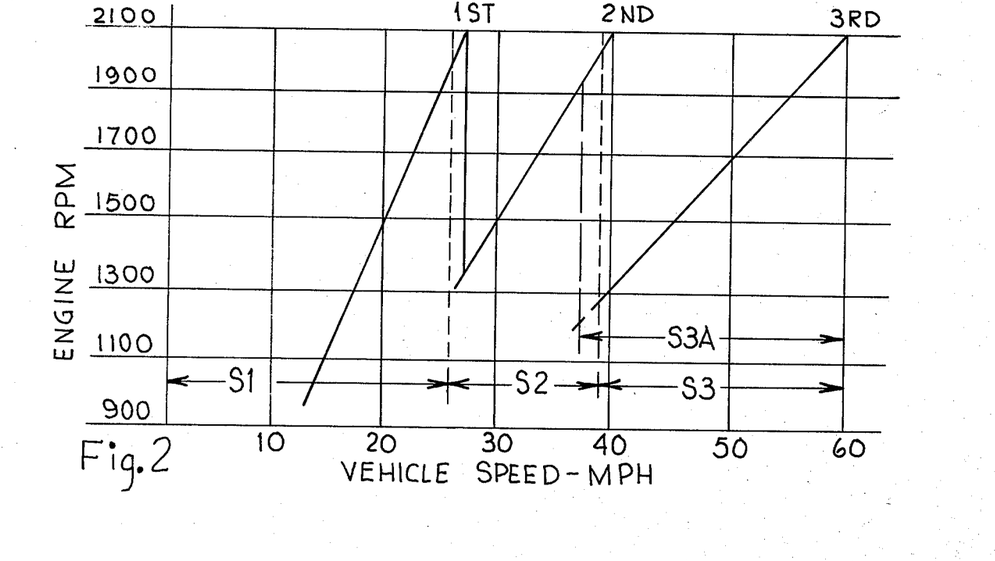
FIG. 2 is a chart showing the relationship of engine speed to vehicle speed in various shift positions of the transmission of the invention.

Now turning to FIG. 2, there is shown for reference purposes a chart indicating typical relationships between vehicle speed in miles per hour and engine rpm. This shows that the range of speed S–1 of the first gear ratio extends from standstill to a vehicle speed of, here, 26 mph which here is slightly less than the maximum possible obtainable if the engine were caused to operate at is maximum speed, that second speed range S–2 extends from the end of S–1 to about 39.5 mph, a point again slightly less than the maximum speed available in the second gear ratio and that the third speed range S–3 extends from the end of S–2 to and including the maximum speed obtainable, here 60 mph, in the third gear position with the engine running at its maximum governor speed. These speed relationships will be referred to further hereinafter.

Figure 3:
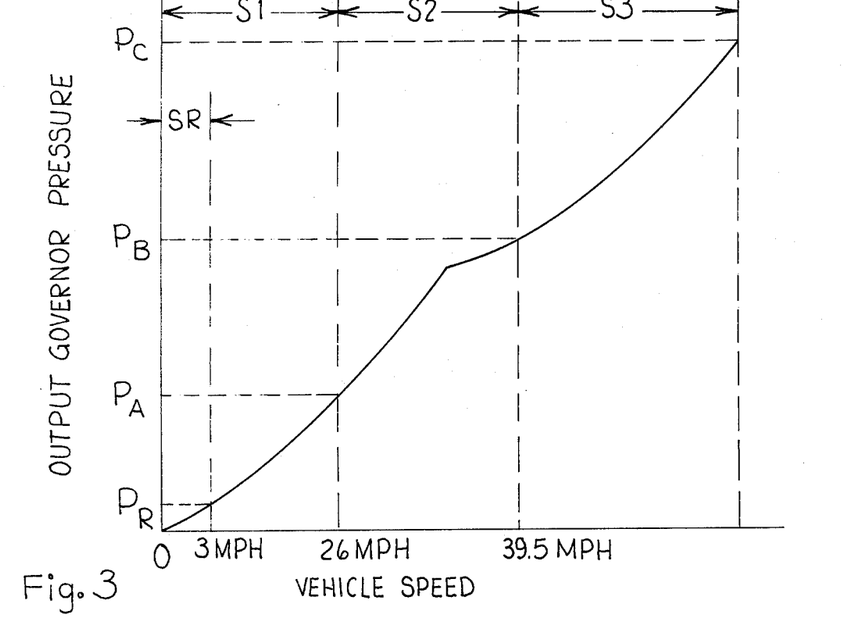
FIG. 3 is a graph illustrating a typical relationship between vehicle speed and pressure developed by an appropriate speed sensitive pressure developing device, which device may be utilized for signalling shift changes.

FIG. 3 shows the relationship between the speed of the vehicle and one device for sensing same, namely the pressure generated in a pressure fluid, such as oil, by a pump or other pressure generating means in response to output speed of the transmission. Said chart also relates the energization of certain pressure sensitive means with control relays in the transmission control system.

Figure 4:
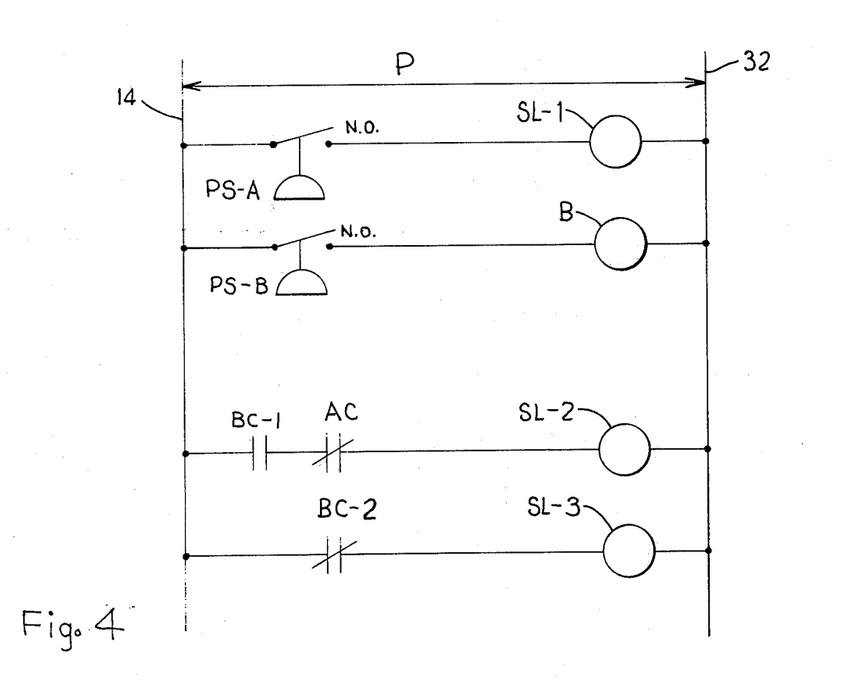
FIG. 4 is a schematic diagram of one portion of the control mechanism comprising the invention and indicating its relationship to the speed sensitive pressure developing device.

Referring now to FIG. 4, there is shown one convenient system for connecting speed sensitive means responding to the speed of the vehicle with appropriate relays for controlling the transmission control circuit. A bus line 14 is associated with a bus line 32 and an appropriate voltage P applied therebetween. A pressure switch PS–A is arranged for energization and closing when the pressure source falls within the range from zero to $P_A$ (FIG. 3) representing the appropriate range S-1 for first speed transmission condition. Said switch PS-A is connected through the winding of the first speed relay SL-1 and thence to the bus line 32. A pressure switch PS-B becomes energized and closed when said speed indicating pressure is in the range between zero and $P_B$ and is connected from the bus line 14 to the winding of the second speed relay winding B to the bus line 32.

An appropriate conductor connects the bus line 14 to one side of the normally open contacts BC-1 of the relay B, thence to the normally closed contacts AC of the relay SL-1 and thence through the winding of a further control relay SL-2 to the bus line 32. A further conductor connects the bus line 14 through a pair of normally closed contacts BC-2 of the relay B, thence through the winding of the third speed relay SL-3 to the bus line 32. Thus, the winding of relay SL-1 is in the present embodiment energized by the closing of switch PS-A when the vehicle speed is between zero and 26 mph. This determines the first speed range of the control system. The closing of switch PS-B between zero and 39.5 mph energizes the winding of relay B and closes contacts BC-1 in that range. Since switch PS-A opens above 26 mph and thus closes contacts AC, the winding of relay SL-2 is energized between 26 mph and 39.5 mph and this determines the second speed range. Above 39.5 mph relay winding B is de-energized and contacts BC-2 are closed energizing relay winding SL-3 above 39.5 mph which is third speed range.

The functions of the relays SL-1, SL-2 and SL-3 will appear further hereinafter.

Figure 5:
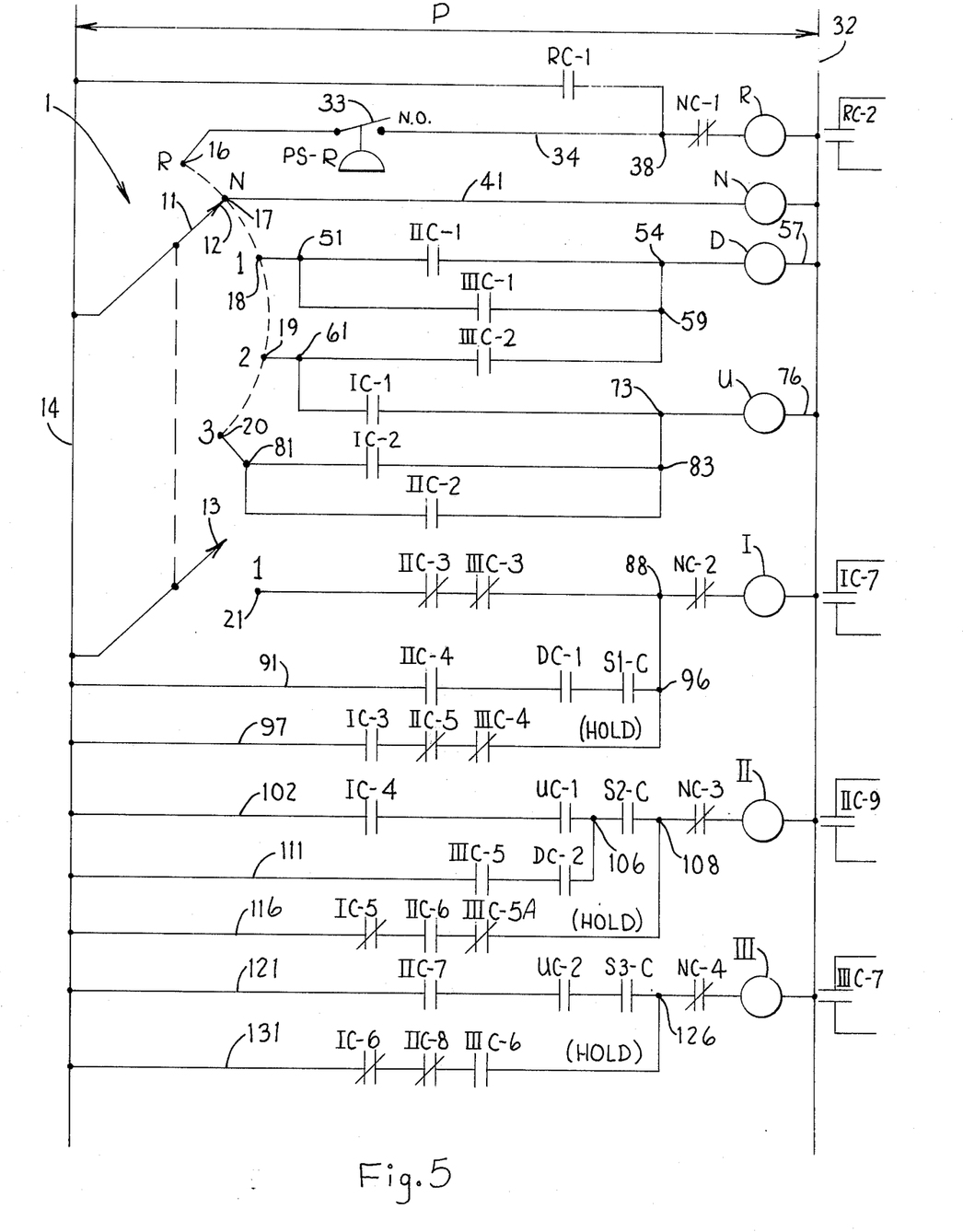
FIG. 5 is a schematic diagram of another portion of the control mechanism comprising the invention and its relationship to the transmission.

Now turning to FIG. 5, there is shown a schematic diagram of the shift control system comprising the manual selector 1 and the shift control means 2 referred to above in FIG. 1.

The shift selector lever 11 has a pair of contact points 12 and 13 which are energized from the bus line 14 and cooperate with selectable contacts 16-21 as shown. Particularly, the contact point 12 may be moved by operation of the selector lever 11 to the reverse contact 16 or to the neutral contact 17 and under such conditions the contact point 13 will be disengaged. However, when the contact point 12 contacts the first gear contact 18, the contact point 13 will engage the contact 21. Continuing, however, when the contact point 12 contacts the second gear position 19 and the third gear position 20, the contact point 13 becomes disengaged from contact 21.

Turning now to construction of the control apparatus, there is shown a pair of bus lines 14 and 32 across which is provided a source of potential P from the electrical system of the vehicle. These bus lines are for simplicity shown as the same bus lines as in FIG. 4 but it will be understood that they may be the same or different as desired.

Commencing with the reverse contact 16, same is connected through a speed responsive switch 33 through a junction point 38 to the normally closed contacts NC-1 of a hereinafter described neutral relay to the winding R of the reverse solenoid. The speed sensitive switch 33 is open at a forward speed in excess of a small value, such as three miles per hour, but closes when the forward speed drops below such value. The reverse relay R also includes a pair of normally open contacts RC-1 which are connected between the junction point 38 and the bus line 14. The reverse relay also operates the reverse contacts RC-2 which are connected to any suitable source of power and other means not shown for effecting when closed the engagement of the means shifting the transmission into its reverse gear position. Such apparatus is already well known and needs no detailing but as an example it may be said that the contacts RC-2 when closed energize a solenoid control valve which in turn applies pressure to conventional apparatus for engaging a friction clutch and said friction clutch in turn effects engagement of the reverse gears of the transmission.

The neutral contact 17 is connected through a conductor 41 to the winding of a neutral relay N whose normally closed contacts NC-1, NC-2, NC-3 and NC-4 will be further described hereinafter. Said neutral relay winding N is then connected by a further conductor to the bus line 32.

The first gear contact 18 is connected through a junction point 51 to one side of the normally open contacts IIC-1 of a second speed relay II further described hereinafter, the other side of said contacts being connected through a junction point 54 and thence through the winding D of a downshift indicating relay and through the conductor 57 to the bus line 32. The junction point 51 is also connected to one side of the normally open contacts IIIC-1 of a third speed relay III further described hereinafter. The other side of said normally open contacts IIIC-1 is connected through a junction point 59 further described hereinafter back to the junction point 54.

The second speed contact 19 is connected through the junction point 61 to one side of another set IIIC-2 of normally open contacts of the third speed relay and the other side thereof is connected to the junction point 59.

The junction point 61 is also connected to one side of the normally open contacts IC-1 of the first speed relay whose winding I will be further described hereinafter and the other side of said contact IC-1 is connected through a junction point 73 to one side of the winding U of an upshift indicating relay whose other side is connected by the conductor 76 to the bus line 32.

The third speed contact 20 is connected through a junction point 81 to one side of another pair of normally open contacts IC-2 in the first speed relay and the other side of said contacts is connected through a junction point 83 to the junction point 73. The junction point 81 is also connected to one side of another pair of normally open contacts IIC-2 in the second speed relay and the other side thereof is connected to the junction point 83.

The second first speed contact 21 is connected through a set of normally closed contacts IIC-3 in the second speed relay and thence through a further set of normally closed contacts IIIC-3 for the third speed relay to a junction point 88. Said junction point is then connected through the normally closed contacts NC-2 above mentioned to one side of the winding I of the first speed relay and the other side thereof is connected to the bus line 32.

A further conductor 91 connects the bus line 14 to one side of normally open contacts IIC-4 of the second speed clutch relay, and the other side thereof is connected to one side of normally open contacts DC-1 of the downshift relay, the other side thereof being associated with normally open contacts S1-C of the speed responsive relay SL-1, the other side of which is connected through the junction point 96 to the junction point 88.

A further conductor 97 is connected through one side of normally open contacts IC-3 associated with the winding I of the first speed relay, the other side thereof is connected to one side of normally closed contacts IIC-5 of the second speed relay, the other side thereof being connected to one side of normally closed contacts IIIC-4 of the third speed relay and the other side thereof is connected to the junction point 96.

A conductor 102 is connected to one side of contacts IC-4 of the first speed relay and the other side thereof is connected to one side of normally open contacts UC-1 of the upshift indicating relay and the other side thereof is connected through a junction point 106 to one side of normally open contacts S2-C of the speed sensitive relay SL-2, the other side thereof being connected through a junction point 108 to one side of the normally closed contacts NC-3, the other side of which is connected through said winding II of the second speed relay to the bus line 32.

A conductor 111 is connected from the bus line 14 to one side of the normally open contacts IIIC-5 which are associated with the winding III of the third speed relay and the other side of said contacts is connected to one side of the normally open contacts DC-2 associated with the winding D of the downshift control relay and the other side of said contacts is connected to the junction point 106.

A conductor 116 connects the bus line 14 to one side of the normally closed contacts IC-5 associated with the winding I of the first speed relay, the other side being connected to one side of the normally open contacts IIC-6 associated with the winding II of the second speed relay, and the other side of the latter being connected to one side of the normally closed contacts IIIC-5A associated with the winding III of the third speed relay, the other side thereof being connected to the junction point 108.

The conductor 121 connects the bus line 14 to one side of the contacts IIC-7 associated with the winding II of the second speed control relay, the other side thereof being connected to one side of the normally open contacts UC-2 associated with the winding U of the upshift indicating relay, the other side of the latter being connected to one side of the normally open contacts S3-C of the speed indicating relay SL-3, the other side thereof being connected through a junction point 126 to one side of the normally closed contacts NC-4 associated with the winding N of the neutral relay, the other side of the latter being connected through the winding III of third speed clutch relay to the bus line 32.

The conductor 131 connects the bus line 14 to one side of the normally closed contacts IC-6 associated with the winding I of the first speed control relay, the other side thereof being connected to one side of the normally closed contacts IIC-8 associated with the winding II of the second speed control relay, the other side of the latter being connected to one side of the normally open contacts IIIC-6 associated with the winding III of the third speed control relay, the other side thereof being connected to the junction point 126.

The winding I of the first speed control relay is associated with normally open contacts IC-7 which are connected through appropriate means such as the solenoid winding of a hydraulic valve which in turn controls the engaging clutch for the first speed gear system of the transmission whereby energization of said winding I will place the transmission in its first gear speed. Similarly, normally open contacts IIC-9 are associated with the winding II and similarly relayed to control equipment for the second speed clutch gears so that energization of the winding II will place the transmission in its second speed condition. Contacts IIIC-7 are associated with the winding III and suitable control means for the third speed of the transmission so that energization of the winding III will place the transmission into its third speed position.

OPERATION

In further explanation of the invention, a typical operation will now be traced through both upshift and downshift, bearing in mind throughout that the references to specific apparatus are only for illustration of one preferred embodiment and that a wide variety of such apparatus will be available and may be selected as desired by one skilled in the art.

With the selector lever 11 in its neutral position as shown in FIG. 5, the winding N of the neutral relay is energized and this results in the opening of each of the normally closed relay contacts NC-1, NC-2, NC-3 and NC-4. This de-energizes each of the windings R, I, II and III of the clutch relays and insures that the corresponding speed ratios are disengaged. Thus, the transmission is in neutral.

Now assume the selector 11 is moved to the reverse position so that its contact 12 connects with the reverse contact 16. With the speed of the vehicle under a predetermined minimum, as $P_R$ indicated in FIG. 3, the normally open pressure switch PS-R is energized and its contact 33 closed. With the de-energizing of the neutral winding N, the normally closed contacts NC-1 also close and the winding R of the reverse relay is energized. This closes the contacts RC-2 and effects appropriate shifting of the transmission into its reverse condition. Energizing of the winding R closes the normally open contacts RC-1 which locks the transmission into its reverse position until the selector lever 11 again returns to neutral.

It now being desired to shift into a forward speed, selector 11 may be moved to the first speed position 18 but in doing so it contacts the neutral contact 17 which energizes the neutral winding N and momentarily opens the normally closed contacts NC-1. This de-energizes the reverse winding R and the reverse clutch, or other reverse position effecting means of the transmission, becomes disengaged.

At the same time, so long as the vehicle speed is below $P_A$, both of switches PS-A and PS-B will be closed. Thus the winding of relay SL-1 will be energized and those of relays SL-2 and SL-3 will be de-energized.

With the selector lever now in the first speed position, potential is applied to both of the first speed contacts 18 and 21. Inasmuch as both of the pairs of contacts IIC-1 and IIIC-1 are open, no energization is applied to the winding D of the downshift relay. However, inasmuch as the contacts IIC-3, IIIC-3 and NC-2 are closed, potential is applied to the winding I of the first speed clutch relay, the contacts IC-7 are closed and the transmission is shifted into its first speed position. Contact IC-3 closes and holds the first speed clutch relay on even if the selector lever is moved to second or third speed position.

Assuming now that instead of the operator having put the selector lever into the first speed position he placed same into third speed position, which would be the normal procedure on the assumption that he wishes the vehicle to gain road speed but do so under its own control, the point contact 12 will be on third speed contact 20 but the point contact 13 will have passed over the first speed contact 21. Since all of the contacts associated with contact 20, as well as with contacts 18 and 19 which the point 12 touched on its way to the contact 20 are all normally open, there will be no energization of either of the windings U or D of the upshift and downshift relays, respectively, and same remain de-energized. However, as above described, when point 13 momentarily engages contact 21, the winding I of the first speed clutch relay is energized, is held in by contact IC–3, the vehicle transmission assumes its first speed position and the vehicle commences to move forward in its first gear ratio.

With the energizing of the winding I, the contacts IC–3 are closed and with the contacts IIC–5 and IIIC–4 remaining closed the holding circuit for the winding I becomes energized and the transmission is locked into its first gear ratio. At the same time the contacts IC–2 in circuit with the upshift winding U are closed and potential is applied to the winding U of the upshift relay. This results in the closing of the contacts UC–1 in circuit with the winding II of the second speed relay and with the contacts NC–3 of the neutral relay and IC–4 of the first speed relay already closed the winding II is ready for energization upon closing of the contacts S2–C of the speed sensing relay SL–2.

As the vehicle gathers speed it reaches a speed which develops a pressure above $P_A$. This causes the pressure switch PS–A to open and de-energizes the winding of the speed responsive relay SL–1. With the switch PS–B already closed, as above mentioned, this closes both pairs of contacts in circuit with the winding of relay SL–2 resulting in energization thereof. Such energizing closes the contacts S2–C above mentioned and the winding II of the second speed clutch relay is energized resulting in the closing of the contacts IIC–9 and the shifting of the transmission into its second speed position. With the energizing of the winding II the contacts IIC–3 and IIC–5 are open resulting in de-energizing of the winding I of the first speed clutch thus permitting the transmission to leave its first speed position. At the same time the contacts IIC–6 in the second speed clutch holding circuit are closed and, with the winding I de-energized, the contacts IC–5 are closed so that the holding circuit is completed and results in locking the second speed relay in its energized and clutch engaging condition when winding II is energized, contacts IIC–2 are closed to thus hold relay U energized, even though contacts IC–1 and IC–2 open when relay I is de-energized.

The vehicle now continues to gather speed through its second speed range until the pressure sensitive device attains the pressure $P_B$ and the vehicle is ready to enter into the third speed range. This de-energizes and opens the pressure switch PS–B resulting in de-energizing of the winding B of the second speed control switch. This closes the contacts BC–2 in circuit with the third speed switch and energizes the winding SL–3 thereof. It also opens the contacts BC–1 and de-energizes SL–2. With the contacts IIC–7 and UC–2 being already closed by the energizing of the second speed clutch winding II and the upshift indicating winding U, closing of the contacts S3–C of the third speed relay completes the circuit through the winding III of the third speed clutch relay and same is energized for closing the contacts IIIC–7 and initiating movement of the clutch parts into their third speed condition. At the same time energizing of the winding III closes the contacts IIIC–6 in the holding circuit thereof so that same remains energized after the de-energization of the second speed winding II by opening IIIC–5A and the opening of the contacts IIC–7.

Attainment of third speed position by the vehicle and energizing of the third speed relay winding III opens the switch IIIC–3 to hold the winding I de-energized. Due to deenergization of winding II, the contacts IIC–2 are also opened when the transmission is moved out of its second speed condition. Thus, the winding U of the upshift indicator relay is de-energized and the contacts UC–1 are opened. Thus, even though the vehicle speed moves back into the normal second speed range, the second speed solenoid winding II remains de-energized and the transmission remains in its third gear position.

The transmission is now in its third speed position which is the highest speed assumed to be present in the transmission chosen here for illustrative purposes. It will be obvious, however, that in the light of the foregoing further speeds may be added by further multiplying of the sequence above described up to any desired number.

It will be further recognized that the transmission followed its normal sequencing in response to speed without further movement of the selector lever 11.

Assume now that while the transmission was in its second speed position the vehicle encountered a resistance, such as an upward incline or a head wind, which forced its speed down into the range of S1, namely corresponding to a pressure less than $P_A$. This would result in an opening of the contacts S2–C and closing of the contacts S1–C in the first speed clutch circuit. However, no shift will take place because (a) the energizing of the winding II of the second speed clutch holds open the contact IIC–3 in the first speed clutch circuit, and (b) there is no potential on the downshift relay winding D and hence the contacts DC–1 are open and the contacts IIC–5 are open. Hence the transmission cannot shift into its first speed condition even though the vehicle speed may drop into the speed range appropriate thereto. Accordingly, if in the operator's judgment the resistance is only temporary he may leave the selector lever 11 in the third speed position with the expectation that the vehicle will presently pick up speed and resume its progression toward third speed operation. However, if in the operator's judgment the resistance is likely to continue, and he desires to return the vehicle to the first speed condition, he can move the selector lever back to first speed position, namely with the point 12 in contact with the point 18 and the point 13 in contact with the point 21. Since the second speed relay winding II is still energized, the contacts IIC–1 remain closed and this will energize the downshift relay D. This closes the contacts DC–1, the contacts IIC–4 having already been closed by the energizing of the second speed relay winding II. With the speed now being in the low speed range, the contacts S1–C are closed and the winding I energized for shifting the transmission into its first speed position. At the same time, with the energizing of the winding I the contacts IC–5 are open and with the speed having moved out of the second speed range the contacts S2–C are open. Thus, the winding Ii for the second speed relay is de-energized and the transmission is permitted to move out of its second speed position and into the first speed position in response to the energizing of the first speed winding I as above mentioned. Contacts IC–3 close and the holding circuit including same now becomes effective.

If the transmission is in its third speed position and resistance is encountered, it will be recognized by analysis of FIG. 5 in the same manner as above set forth with respect to the resistance encountered in the second speed position that the transmission will not shift downwardly out of the third speed position unless and until the selector lever is moved either to the second speed or to the first speed positions. If it is moved into the second speed position, the shift will take place into the second speed position in a manner generally similar to that above described for moving from second into first speed position. If, however, it is moved to the first speed position it will cycle downwardly first into the second speed position while the vehicle speed is in the second speed range and then down into the first speed position as the vehicle speed enters the first speed range.

If now the vehicle transmission is in for example its second speed position during a downshift sequence and an accelerating condition is encountered, such as a tail wind or a downhill slope so that the vehicle speed in fact moves into the third speed range, the system of the invention will hold the apparatus in its second speed ratio and will not permit it to move upwardly into third speed position unless and until the selector lever is moved into its third speed position. Thus, the vehicle transmission will not follow a momentary tendency for acceleration and in fact the lower gear and consequently the engine may be utilized for resisting such accelerating tendency on a longer downhill operation.

Specifically, assuming the selector lever to have been moved from third speed to second position and thus to be in the second speed position in a downshifting mode and the holding circuit to have been energized, the contacts S2–C will be opened by the speed of the vehicle returning into the S3 range and the contacts S3–C will be closed. However, the movement of the selector from the third speed position 20 to the second speed position 19 while the vehicle transmission was in third speed condition, namely with the third speed relay winding III energized, resulted through the closed contact IIIC–2 in energizing of the downshift relay winding D. The contact IIIC–5 being closed, energizing of winding D in turn closes the contacts DC–2 in the circuit of the second speech clutch II. Thus, when the vehicle enters the second speed range the contacts S2–C close and the relay II becomes energized for moving the transmission system into its second speed position. However, if now the vehicle speed moves back into its third speed range the contacts SC–2 are open but the holding circuit with the contacts IIC–6 being closed holds the relay II energized. In the meantime the de-energizing of the winding U of the upshift indicating relay opened the contact UC–2 and the energizing of the winding II opens the contacts IIC–8. Thus, even though the contacts S3–C are closed the third speed clutch III is not energized and the apparatus cannot move back into third speed position.

Similarly if the selector switch had been moved to the first speed position and the clutch ratios were in the process of cycling down to such first speed position, an increase in vehicle speed either while the transmission is in second position or after it attains first position, will not result in an upshift unless and until so permitted by appropriate movement of the selector lever.

Other shift patterns, both upshift and downshift, shift progressions extending through the entire shift range or through only a part thereof will be recognized and understood from the foregoing without further description and will consistently carry out the objectives of permitting and effecting automatic shifting to take place in the direction and through a range manually selected by the operator but not permitting shifting in a reverse direction to take place unless and until there occurs appropriate movement of the manual selector by the operator.

It will be noted throughout that both the upshifts and the downshifts take place at the same speed with respect to each shift location. Thus, the hysteresis losses above mentioned as occurring with certain previously known equipment are avoided and the apparatus is simplified.

It will be recognized also that all of the specific components for an embodiment of the invention are standard and will be readily selectable by those skilled in the art including means for effecting appropriate shift of the transmission in response to the closing of the contacts RC–2, IC–7, IIC–9 and IIIC–7. Thus, further detailing of the apparatus of the invention is unnecessary. Additionally it will be recognized that the specific circuitry set forth and described above is only exemplary of one specific embodiment of the invention and that other embodiments of such circuitry and component arrangements will be apparent as needed or desired to those skilled in the art.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A semi-automatic, multi-ratio transmission having at least three power paths defining low, intermediate and high speed ratios, the improvement comprising:
   speed sensitive controlling means for controlling the automatic shifting of said transmission, said controlling means including first control means for effecting automatic shifting of said transmission only in an upshift direction and second control means for effecting automatic shifting of said transmission only in a downshift direction;
   operator controllable selector means coacting with said first and second control means for determining the direction of automatic shifting; and
   holding means for preventing downshifting of said transmission when said first control means is activated and for preventing upshifting of said transmission when said second control means is activated.

2. A transmission according to claim 1, wherein said controlling means includes neutral control means for placing the transmission in a non-power transmitting condition; and said operator controllable selector means including a neutral position for activating said neutral control means, said operator controllable selector means including a manually movable selector member mounted for movement in one direction away from said neutral position for controlling upshifting and movable in the opposite direction toward said neutral position for controlling downshifting.

3. A transmission according to claim 2, wherein said selector means automatically activates said first control means when said selector member is moved in said one direction and automatically activates said second control means when said selector member is moved in said opposite direction.

4. A transmission according to claim 1, wherein said operator controllable selector means includes a manually movable selector member which can be movable in either an upshift or a downshift direction for positioning said transmission in a selected speed ratio;

said first control means including upshift circuitry means activated by said selector means when said selector member is moved in said upshift direction for permitting upshifting of said transmission to take place automatically until the ratio selected by the operator has been reached;

said second control means including downshift circuitry means activated by said selector means when said selector member is moved in a downshift direction for permitting automatic shifting of said transmission in a downshift direction until the ratio selected by the operator has been reached; and said holding means including holding circuitry means coacting with said upshift and downshift circuitry means for preventing downshifting when said upshift circuitry means is energized and for preventing upshifting when said downshift circuitry means is energized.

5. A transmission according to claim 4, wherein said controlling means includes speed sensing means associated with said upshift and downshift circuitry means for controlling the automatic shifting between the various speed ratios.

6. A transmission according to claim 4, wherein said transmission includes first, second and third clutch means associated with said low, intermediate and high speed ratios, respectively;

said controlling means including first, second and third electrical relay means for controlling the energization of said first, second and third clutch means, respectively;

speed sensing means coacting with said first, second and third relay means for controlling the progressive energization thereof, said speed sensing means including first responsive means for permitting energization of said first relay means whenever the speed is below a first predetermined maximum, second responsive means for permitting energization of said second relay whenever the speed is below a second predetermined maximum which is greater than said first predetermined maximum, and third responsive means for permitting energization of said third relay means whenever the speed exceeds said second determined maximum; and said holding circuitry means maintaining whichever one of said first, second and third relay means is energized in its energized state even though the vehicle speed may change in the direction opposite to the selected shift direction and falls within the speed range of a different electrical relay means.

7. A control system for a vehicle transmission having at least three selectible forward speed ratios, comprising:

a plurality of circuitry means each associated with a respective speed ratio for effecting automatic shifting of said transmission into the respective speed ratio;

speed responsive means for sensing vehicle speed and for energizing one of said circuitry means corresponding to the vehicle speed, said speed responsive means including speed controlling means associated with each of said circuitry means for activating same and effecting automatic shifting of said transmission in response to the vehicle obtaining a preselected speed;

manually movable selector means for permitting said transmission to be selectively disposed in either an upshift or a downshift mode of operation;

upshift circuit means actuated by said manually movable selector means when same is moved in said upshift direction for permitting automatic upshifting of said transmission until reaching the preselected speed ratio selected by said selector means, said upshift circuit means including control means associated with said plurality of circuitry means for permitting automatic upshifting of said transmission until reaching said preselected speed ratio; and energy interrupting means associated with said plurality of circuitry means for permitting automatic upshifting of said transmission from one speed ratio into the next successive speed ratio in response to increases in vehicle speed while preventing automatic downshifting of said transmission irrespective of decreases in vehicle speed.

8. A control system according to claim 7, further including downshift circuit means energized by said selector means when moved in said downshift direction for permitting automatic downshifting of said transmission in response to decreases in vehicle speed until said transmission reaches the preselected speed ratio determined by said selector means, said downshift circuit means including second control means associated with said plurality of circuitry means for permitting sequential energization thereof for causing the transmission to be downshifted sequentially through the speed ratios in response to decreases in vehicle speed; and second energy interrupting means associated with said plurality of circuitry means for permitting sequential and automatic downshifting of said transmission toward said selected speed ratio as said vehicle speed decreases while preventing upshifting of said transmission irrespective of increases in vehicle speed.

9. A control system according to claim 8, including neutral circuit means energized by said selector means when same is disposed in a neutral position for placing said transmission in a non-power transmitting condition.

10. A control system according to claim 9, wherein said speed responsive means includes a plurality of normally open speed responsive switches with one of said speed responsive switches being associated with each of said circuitry means for permitting energization thereof when the vehicle speed is in a preselected range.

11. A control system according to claim 9, wherein said upshift circuit means includes upshift electrical relay means which is energized only when said selector means is moved in an upshift direction, and said downshift circuit means including downshift electrical relay means which is energized only when said selector means is moved in a downshift direction, each of said electrical relay means having normally opened relay switches associated with several of said plurality of circuitry means for controlling the energization thereof, the relay switches associated with the upshift and downshift relay means and as associated with each circuitry means being connected in parallel with one another.

12. A control system according to claim 9, wherein each circuitry means includes electrical means which, when energized, controls a clutch for effecting shifting of said transmission into a selected speed ratio.

* * * * *